W. F. HAUN.
LOCOMOTIVE GRATE.
APPLICATION FILED MAR. 19, 1919.
1,312,031.
Patented Aug. 5, 1919.
2 SHEETS—SHEET 2.
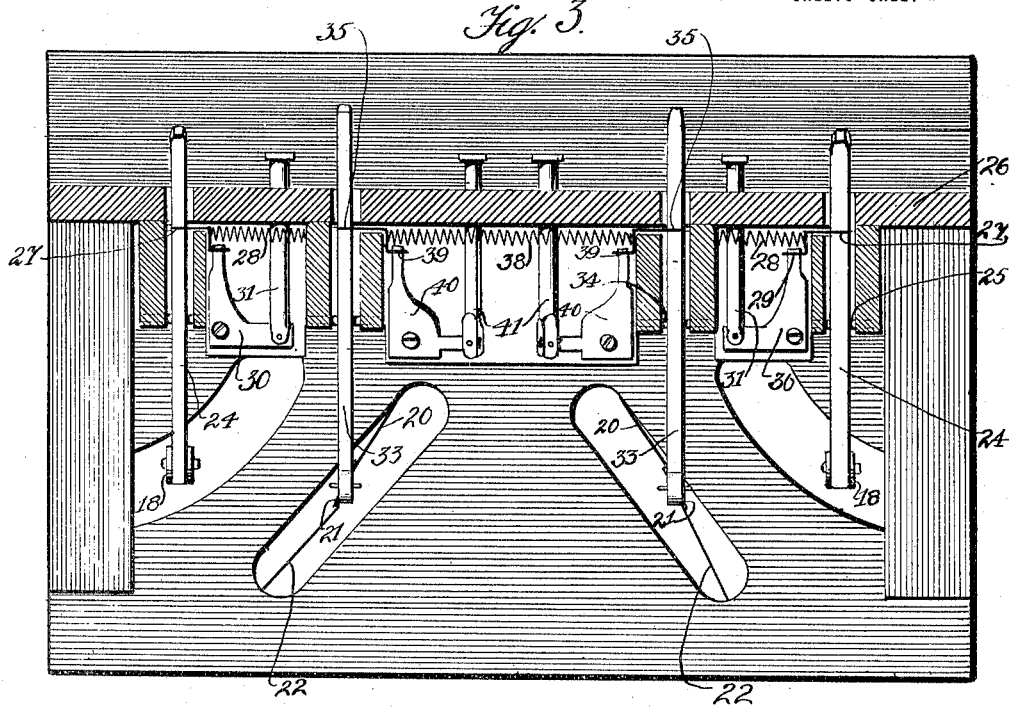
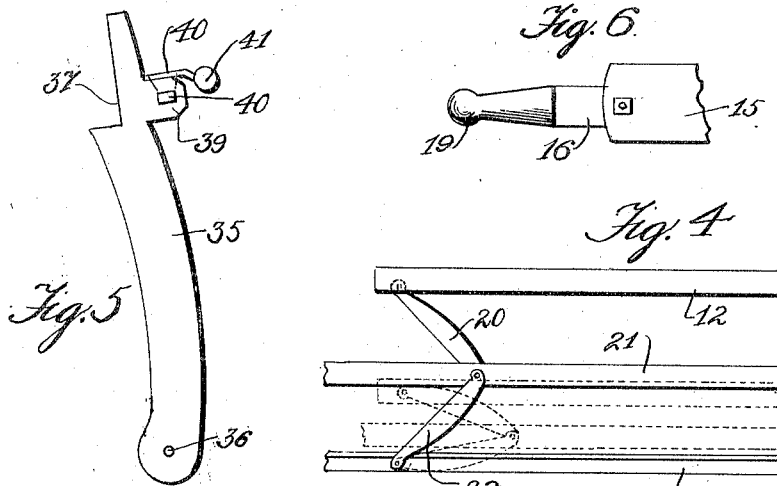
WITNESSES
Ralph Brauner.
INVENTOR
Wallace F. Haun,
BY
ATTORNEYS

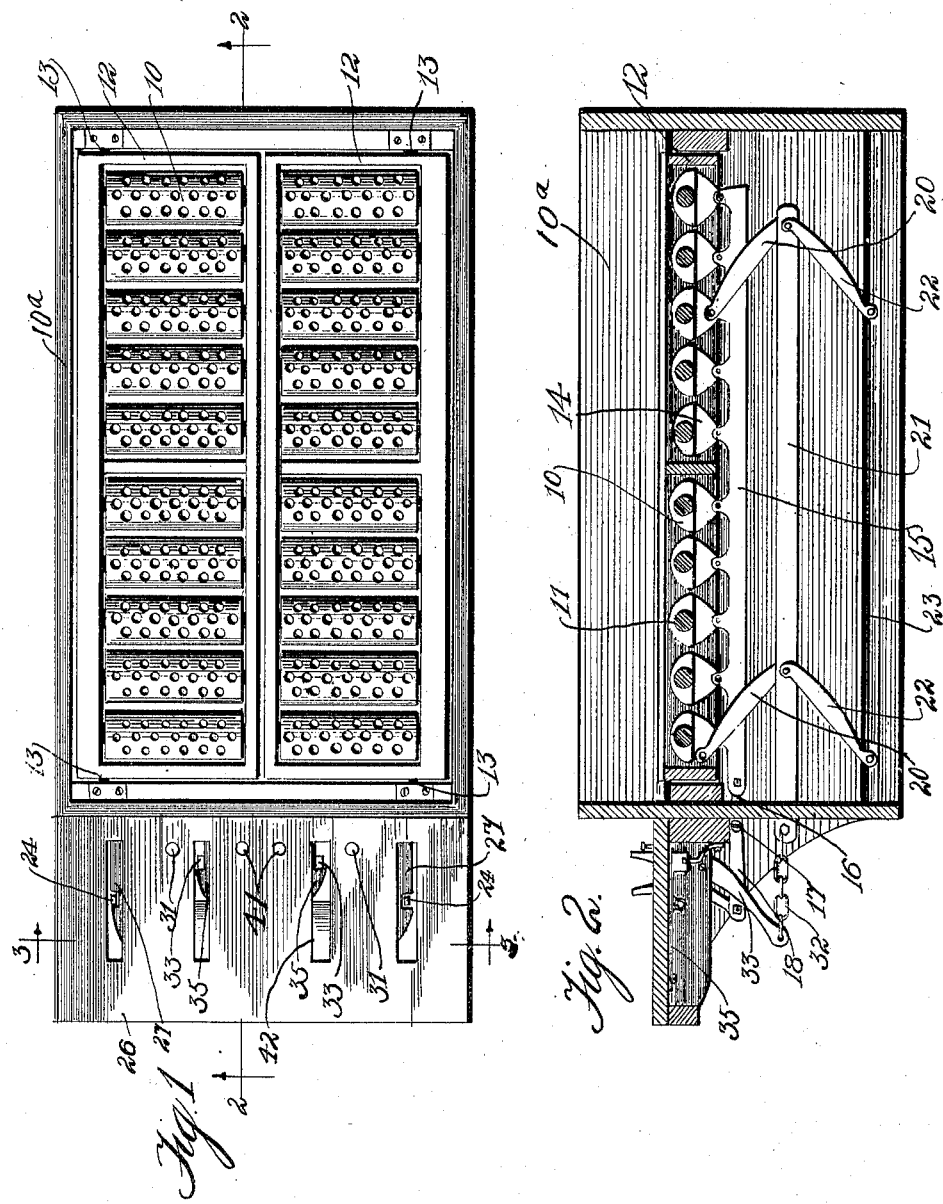

UNITED STATES PATENT OFFICE.

WALLACE FAZZELLOU HAUN, OF MEADVILLE, PENNSYLVANIA.

LOCOMOTIVE-GRATE.

1,312,031.          Specification of Letters Patent.          Patented Aug. 5, 1919.

Application filed March 19, 1919. Serial No. 283,518.

*To all whom it may concern:*

Be it known that I, WALLACE F. HAUN, a citizen of the United States, and a resident of Meadville, in the county of Crawford and State of Pennsylvania, have made certain new and useful Improvements in Locomotive-Grates, of which the following is a specification.

My present invention relates generally to furnace grates, and particularly to shaking grates, my object being the provision of a grate for use in connection with locomotives which will permit the fire box to be perfectly cleaned, emptying it of all clinkers and ashes in much less time and with greatly reduced labor as compared to the present possibilities, whereby to effect a decided saving of time, coal and water.

In the accompanying drawings illustrating my present invention, and forming a part of this specification:—

Figure 1 is a top plan view of my improved grate;

Fig. 2 is a vertical longitudinal section taken therethrough substantially on line 2—2 of Fig. 1;

Fig. 3 is a vertical transverse section taken substantially on line 3—3 of Fig 1;

Fig. 4 is a side view of portions of the dumping arrangement;

Fig. 5 is a detail plan view of one of the latch members, and,

Fig. 6 is a detailed side view of a portion of the shaking connections.

Referring now to these figures, my invention embodies a grate structure in which are utilized longitudinal series of transversely disposed crescent shaped grate bars 10 preferably apertured, as shown in Fig. 1 and supported by end trunnions 11 within juxtaposed frames, each pivotally mounted in a support 10$^a$ by means of trunnions 13 adjacent the outer side thereof so that their inner portions may drop, each frame swinging on its trunnions 13 independently of the other.

Each of the grate bars 10 has a depending extension 14 at its ends corresponding to the pivoted side of its frame 12, and the series of extensions 14 of the grate bars of each frame are pivotally connected at spaced points to a shaking bar 15, the forward end of which is pivotally connected to a connecting link 16 in turn connected by a universal joint 17, to the rear end of a link 18. For this purpose the link 16, as seen in Fig. 6, has a ball-shaped end 19, which is engaged within a socket at the rear end of the link 18.

To the inner side portion of each of the frames 12 are pivotally connected the upper end of toggle arms 20 whose lower ends are pivotally connected to a longitudinal toggle bar 21 having links 22 depending therefrom and pivotally connected to a supporting bar 23 extending longitudinally beneath the respective frame 12.

The supporting beams 23 being stationary below the two grate frames, it is thus evident that forward movement of the toggle bar 21 will serve to let the inner free sides of the frames 12 downwardly on their trunnions 13 to the position shown in dotted lines in Fig. 4, opposite movement of the toggle bar serving to lift the grate frames 12 to normal horizontal position of Figs. 1 and 2 where they are held under normal working conditions by virtue of certain latched operating connections to be presently described.

To the rearmost link 18 of each of the grate shaking connections is pivotally connected the lower end of a shaking lever 24 fulcrumed at 25 with its upper portion upstanding through the control deck 26 of the support 10$^a$ and exposed for the application of a shaker bar thereto, and each of these shaking levers 24 is normally held by a latch member 27 in the manner seen in Fig. 1, which is notched to receive the shaking lever. Each latch member 27 is pivoted adjacent its forward end beneath the deck 26, and engaged by a spring 28, as seen in Fig. 3, which tends to shift the latch member into engagement with the lever 24 and each latch member has an extension 29 at one side through which the upright portion of a bell crank 30 projects, the horizontal portion of which bell crank is pivoted to the lower end of a vertically shiftable foot treadle 31, the upper end of which projects above the deck 26.

Thus when it is desired to shake either or both of the series of grate bars 10, the levers 24 are actuated by the usual shaking bar after the foot treadle 31 has been depressed so as to shift the latch member 27 laterally upon its pivot and out of engagement with the shaking lever 24. This operation is of course repeated so that both series of grates may be shaken.

The rearmost end of each of the toggle bars 21 is connected by a flexible chain 32 to the lower end of a dumping lever 33, fulcrumed at 34 beneath the deck 26 with the upper end thereof projecting above the deck, as seen in Fig. 3 in particular.

The upper portion of each of the dumping levers 33 is normally held in forward position to maintain the toggle bar 21 retracted by virtue of its engagement by a latch member 35, pivoted at one end at 36 beneath the deck 26 and notched at its opposite end as at 37 in Fig. 5, to engage the lever 33. Each latch member 35 is engaged by a spring 38, as seen in Fig. 3 to normally hold the latch member in engaged relation, and each latch member has a lateral extension 39 through which the upper end of the vertical portion of a bell crank 40 projects, said bell crank lever having a horizontal arm pivotally connected to the lower end of a vertically movable treadle bar 41.

The upper end of each treadle bar 41 projects above the deck 26 and downward pressure thereon serves to rock the bell crank 40 and thus withdraw the free end of the latch member 35 to released position, and the lever 33 is immediately rocked by the weight of its respective grate frame and the grate frame drops to the dumping position upon its trunion 13.

The above operation as described with respect to the grate bars and grate frames is of course incident to each thereof, for which the series of levers 24 and 33 are shown working in longitudinal slots 42 of the deck 26 in Fig. 1, and it will be observed that by virtue of the inclined relation of the toggle arms 20 and 22, as seen in Fig. 3, and the connection of the same with the free inner sides of the grate frame 12, the grate shaking connection, including the shaking bars 15, may be operated when the grate frames are in either the upper and normal horizontal positions or the lower dumping position, by virtue of the extension of the two shaking bars 15 along the outer side portions of the frames 12 adjacent to the vertical planes of the trunnions 13 on which the frames 12 swing. The twisting movement in the grate shaking connections brought about when the grate frames are either raised or lowered are taken up in the universal joints 17 between the links 16 and 18 of the grate shaking connections as previously described, and it is thus obvious that by depressing the two outer treadles 31 of the series in Fig. 1 the grate shaking connections may be operated to shake the grates solidly and perfectly from the door of the fire box to the flue sheet of a locomotive. It is also obvious that by depressing the two central treadles 41 of the series in Fig. 1, the levers 33 may be released and the grate frames 12 permitted to drop in the manner previously described and in such a way that while these frames are lowered to dump the grate bars may be shaken and cinders or clinging ashes quickly and thoroughly dislodged.

I claim:—

1. The combination of series of grate bars, juxtaposed frames in which said series of grate bars are movably mounted, having hinged connections adjacent their outer sides to permit their inner adjacent sides to swing, vertical supporting connections for the said frames engaging the inner sides thereof, and controlling their movement toward and from dumped position, and connections adjacent each frame for simultaneously shaking the several grates thereof, said last named connections extending along the frames adjacent the hinges thereof, and including flexible portions whereby the grate bars may be shaken in both the normal and dumped positions of the frames.

2. The combination of a series of grate bars, a dumping frame in which the series of grate bars are movably mounted, said frame being hinged adjacent one side, connections for controlling and supporting the frame, a shaking bar pivotally connected to the several grate bars of the series and connections for actuating the said shaker bar, said shaker bar extending along the frame adjacent to the hinge thereof and said shaking connections including a universal joint for the purpose described.

3. The combination of a series of grate bars, a dumping frame in which the grate bars are movably mounted, having a pivotal support at one side, a supporting beam beneath the said frame, a toggle bar shiftable longitudinally beneath the frame, toggle arms extending from the said bar to the said supporting beam and to the free side of the grate frame, and normally latched connections for controlling and moving the said toggle bar, including a lever having a flexible connection with the toggle bar, and a latch normally engaging and locking the said lever.

4. The combination of a series of grate bars, a dumping frame in which the grate bars are movable, a stationary element within which the frame is hinged, having a control deck, a shaking bar pivotally connected to the several grate bars and arranged parallel and adjacent to the hinge on the frame, means at the said deck flexibly connected to the frame for controlling movements of the latter upon its hinge, and means at the deck flexibly connected to the said shaking bar for actuating the latter irrespective of movements of the frame on its hinge.

WALLACE FAZZELLOU HAUN.

Witnesses:
WILLIAM W. GELDIN,
LAURENCE B. STARR.

Copies of this patent may be obtained for five cents each, by addressing the "Commissioner of Patents, Washington, D. C."